United States Patent [19]

Oelbermann

[11] Patent Number: 5,762,786
[45] Date of Patent: Jun. 9, 1998

[54] PLATE FILTER PRESS

[75] Inventor: Max Oelbermann, Remscheid, Germany

[73] Assignee: Rittershaus & Blecher GmbH, Wuppertal, Germany

[21] Appl. No.: 634,834

[22] Filed: Apr. 19, 1996

[30] Foreign Application Priority Data

Apr. 20, 1995 [DE] Germany ............... 195 14 570.4

[51] Int. Cl.⁶ ................................................. B01D 25/12
[52] U.S. Cl. .......................... 210/227; 210/228; 210/231; 100/194
[58] Field of Search ................................ 210/224, 225, 210/226, 227, 228, 229, 230, 231, 232; 100/194, 197

[56] References Cited

U.S. PATENT DOCUMENTS 4,617,863  10/1986  Kenyon ................................ 210/228
4,741,826  5/1988  Geuenich et al. ...................... 210/228

FOREIGN PATENT DOCUMENTS 35 40 786 A1  11/1985  Germany.
39 32 422 A1  9/1989   Germany.
WO 92/06760  8/1991   WIPO.

OTHER PUBLICATIONS

"Membran–System", Rittershaus & Blecher, pp. 1–5.

Primary Examiner—Robert Popovics
Attorney, Agent, or Firm—Hill & Simpson

[57] ABSTRACT

A plate filter press with chamber plates and diaphragm carrier plates and diaphragms secured thereto is provided that makes it possible to provide an adequately large, radial slurry admission cross-section that remains free of blockage. An annular supporting collar that respectively embraces the aperture edge of the chamber plate and has a U-shaped cross-section in its edge region is arranged in the central flow-through opening of every chamber plate, whereby the end of each U-leg comprises an annular seating wedge for supporting the arched diaphragm. The seating wedge extends in the direction of the respectively neighboring diaphragm and does not constrict the radial flow channel to the respective filter space.

15 Claims, 3 Drawing Sheets

PLATE FILTER PRESS

BACKGROUND OF THE INVENTION

The invention is directed to a plate filter press, and specifically to an improved filter plate press with improved cross-sectional flow rates and shorter filtration times.

In known filter presses, an example of which is shown in the brochure entitled "Membrane-System" illustrating filter presses of Rittershaus & Blecher GmbH, the bearing ring which is arranged in the central slurry flow-through openings of the chamber plates includes two ring halves with a parting seam that lies in the middle plane of the chamber plates. The bearing ring halves must be firmly connected to one another with a fastening means or, respectively, to the chamber plate in the edge region of its central slurry flow-through opening. The outside diameter of the bearing ring halves is larger than the diameter of the central slurry flow-through opening of the chamber plate.

A corresponding distance between the lateral surfaces of the bearing ring halves and the neighboring press diaphragm clamp ring must be maintained for an adequately large admission cross-section for the slurry to pass into a filter chamber from the central slurry flow-through opening via a radial flow channel. This distance, however, cannot become so large so that the press diaphragm arches outward by the pressurized medium so that the diaphragm can no longer be supported at the bearing ring half without being damaged. Providing the bearing ring halves with lateral diaphragm seating surfaces therefore always led to a compromise in terms of the admission cross-section of the radial flow channel. Specifically, a large distance between the lateral surfaces of the bearing ring halves and a large distance between the press diaphragm clamp rings provides a good cross sectional flow channel but may result in damage to the diaphragms.

SUMMARY OF THE INVENTION

To overcome the above-described disadvantages known in chamber filtrate presses, the present invention provides a plate filter press having press diaphragms with an alternating arrangement of chamber plate filters and diaphragm plate filters. Both sides of the chamber plate filters and diaphragm plate filters include a filter cloth. A central slurry flow-through opening is arranged in the diaphragm carrier plates and diaphragms with a clamp ring which detachably attaches two diaphragms to each diaphragm carrier plate.

The invention is based on the object of creating a plate filter press of the species initially cited wherein, using simple structural means, an adequately large, radial admission cross-section that remains free of blockages is achieved between the neighboring plate units without the risk of an arched-out or spread-out press diaphragm that can no longer be adequately supported by the central bearing ring of the chamber plate because of the relatively great distance between the two halves of the bearing ring.

A number of advantages are achieved in that the bearing ring of the inventive plate filter press that embraces the edge of the flow-through opening of the chamber plates is fashioned as an annular supporting collar or sleeve having a U-shaped cross-section in its edge region. The end side of each U-shaped cross-section comprises a seating wedge that extends laterally in the direction of the neighboring diaphragm and that essentially does not constrict the radial flow channel to the filter space or chamber. The distance between the facing lateral surfaces of the supporting collar or sleeve and of the clamp ring of the neighboring diaphragm plate can be comparatively large, this resulting in a radial slurry admission flow channel with a large admission cross-section.

The admission cross-section is not reduced to the height of the outside edge surface of the respective clamp ring because annular seating wedge is radially offset from the clamp ring. The supporting collar provides a flow guide surface shaped approximately like the generated surface of a frustum. It is important that the laterally extending annular seating wedge, which lies radially farther toward the outside than the outside edge surfaces of the respectively neighboring clamp ring or a neighboring diaphragm, comprises an oblique surface dropping off roughly like the envelope of a frustum toward the outside edge of the supporting collar. As a result, despite the comparatively liberally dimensioned admission cross-section of the slurry flow, the respective diaphragm can optimally place itself against the approximately frustum-shaped oblique surface of the supporting collar in its outwardly arched position. The diaphragm is therefore supported by the seating wedge which reduces the likelihood of damage to the diaphragm.

The inventively fashioned supporting collars can be successfully utilized both in diaphragm filter presses to be newly constructed as well as for retrofitting existing filter presses in diaphragm plate filter presses.

The annular seating wedges extend laterally from the supporting collar and are arranged such that a distance—which does not diminish when viewed in radial direction—is maintained between the lateral surfaces of chamber plate filters and diaphragm plate filters facing toward one another.

For a further flow-oriented improvement of the slurry admission, the supporting collar can, according to a further feature of the invention, comprise a further flow guide surface preceding the flow guide surface of the seating wedge in the radially inward direction that leads to a further enlargement of the spacing of the lateral surfaces in radially inward direction. The slurry pressed into the flow opening, steered via the two-stage system, therefore proceeds into the respective filter space located between two filter plates disposed opposite one another.

It has proven to be beneficial, in flow-oriented terms, that all flow guide surfaces of the supporting collar and seating wedge be essentially similar with respect to the longitudinal middle plate plane. The wedge angles can thus be, for example, about 30°.

According to a further feature of the invention, both further flow guide surfaces of the supporting collar disposed opposite one another can merge essentially rounded into one another in the region of the longitudinal middle plate plane. This rounding of the supporting collar improves, first, the inflow of the slurry into the admission cross-section and leads, second, to the preservation of the filter cloth surrounding the supporting collar.

The mounting of the supporting collar at a chamber plate is simplified in that, according to a further feature of the invention, the supporting collar is composed of an elastic, rubber-like flexible material, for example of a formed rubber part, that is detachably connectible to the chamber plate. As an alternative, the supporting collar can be integrally applied to the chamber plate and can be of one piece therewith. This solution would come into consideration in new plate filter presses that are immediately equipped with diaphragm plates. Of course, a retrofitting of already existing chamber plates with inventively fashioned supporting collar is likewise possible. It would also be possible to fashion the supporting collar respectively integrated into the filter cloth allocated to the chamber plate.

According to a further feature of the invention, the supporting collar can be fashioned as a one-piece ring collar or can be composed of two ring halves with a central parting seam. Given assembly of a supporting collar of two ring halves, it would be necessary to combine the two halves into a unit with appropriate connector elements after they have been positioned at the chamber plate.

BRIEF DESCRIPTION OF THE DRAWINGS

The invention and the further features and advantages thereof are explained in greater detail with reference to the exemplary embodiment schematically shown in the drawings. The drawings shown are.

DETAILED DESCRIPTION OF THE PREFERRED EMBODIMENTS

Figure 1:
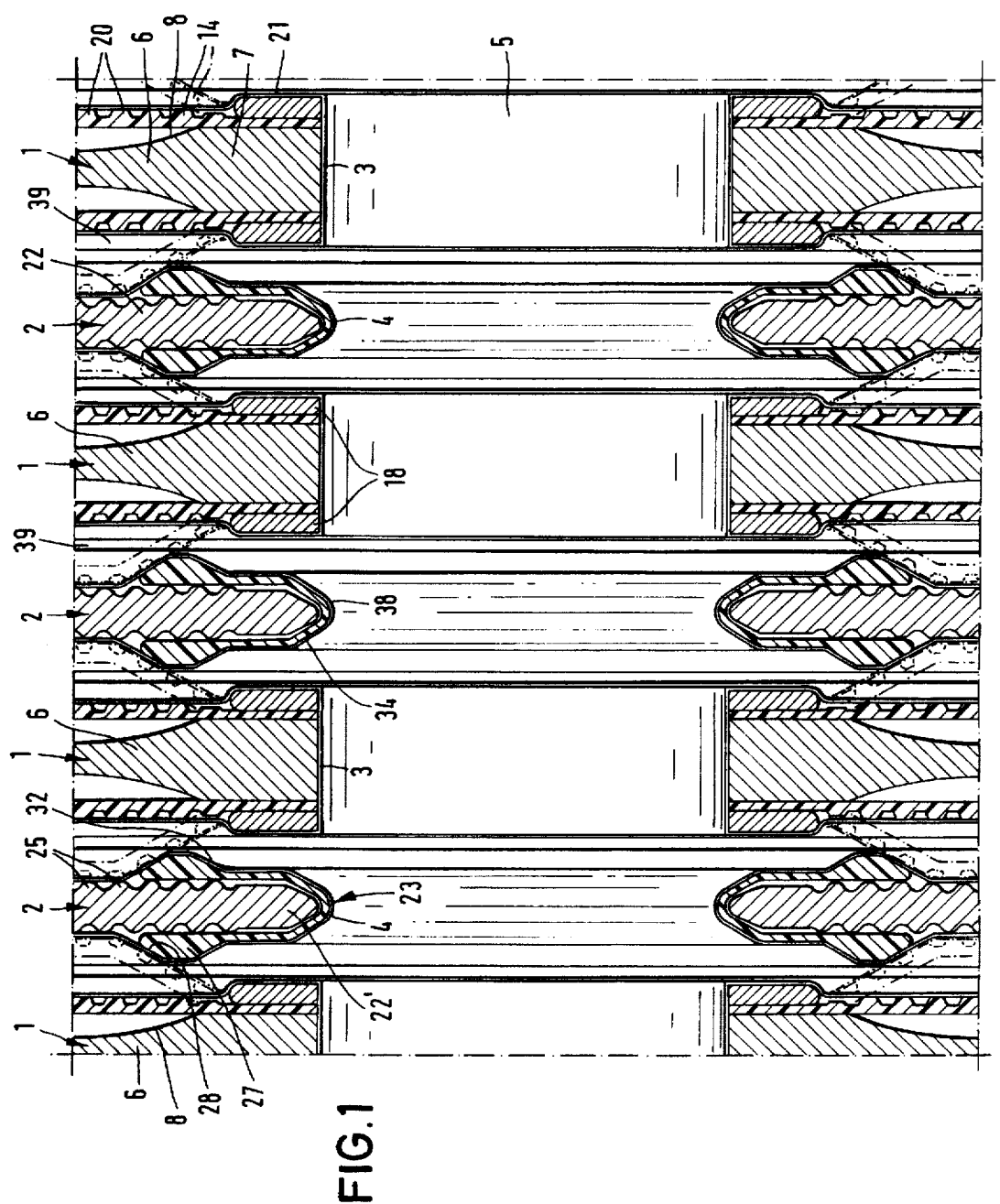
FIG. 1 is a sectional view through the central region neighboring the central slurry channel in a plate packet of a plate filter press comprising chamber plates and diaphragm carrier plates.

The filter arrangement shown in FIG. 1 is part of a diaphragm plate filter press. In detail, the filter packet is composed of diaphragm plate filters 1 and chamber plate filters 2 arranged alternating in succession that have a linear plan in the exemplary embodiment. A round or rectangular plan would likewise be possible. The successively arranged plate filters 1, 2 are each centrally provided with a slurry flow-through opening 3, 4 upon formation of a central slurry channel 5 as a whole into which the slurry is introduced under pressure.

Each diaphragm plate filter 1 has a diaphragm carrier plate 6 that, in the exemplary embodiment, comprises an edge thickening 7, in the edge region of the flow-through opening 3 as well. Via rounded portions 8, the edge thickening 7 merges into the planar lateral surfaces 9. However, planar, smooth diaphragm carrier plates would also be possible.

A respective clamp ring 18 is located in the region of the slurry channel 5 at both sides of the edge thickening 7 of the diaphragm carrier plate 6, the inside clearance of the clamp ring 18 being matched to the diameter of the flow-through opening 3 of the diaphragm carrier plate 6. Two respective diaphragms 14 are detachably clamped to a diaphragm carrier plate 6 with the clamp rings 18. The diaphragms 14 have an inside clearance corresponding to the diameter of the flow-through opening 3.

Figure 2:
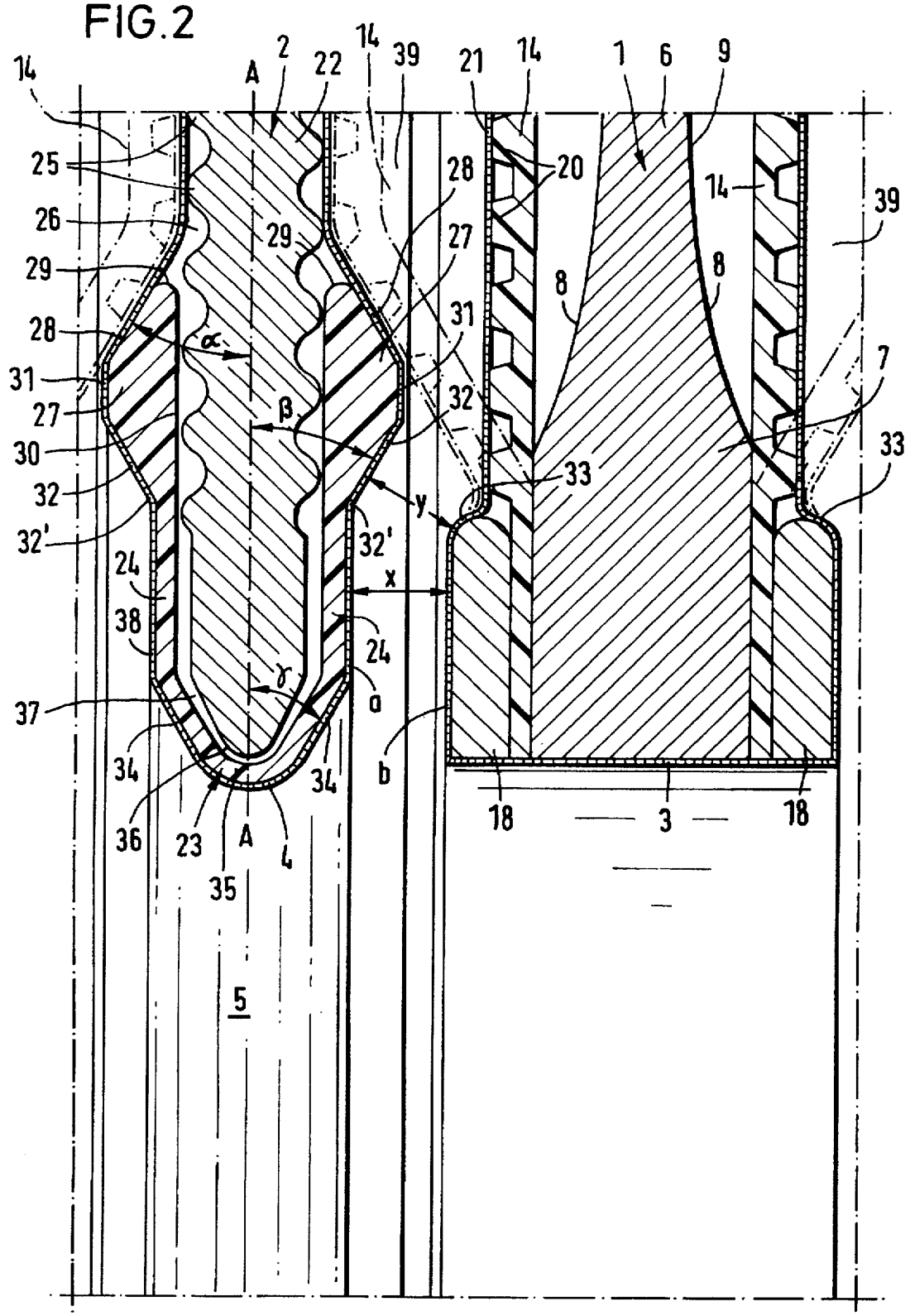
FIG. 2 is an enlarged partial view from FIG. 1 in the region of two filter plates neighboring one another.

As especially illustrated in FIG. 2, each diaphragm 14 has a side facing toward the chamber plate filter 2 and is provided with elevations 20 to which a filter cloth 21 is attached that envelopes the diaphragm plate filter 1. The filter cloth or filter material 21 also covers the region of the diaphragm plate filter 1 at the side of the flow-through opening 3.

Figure 3:
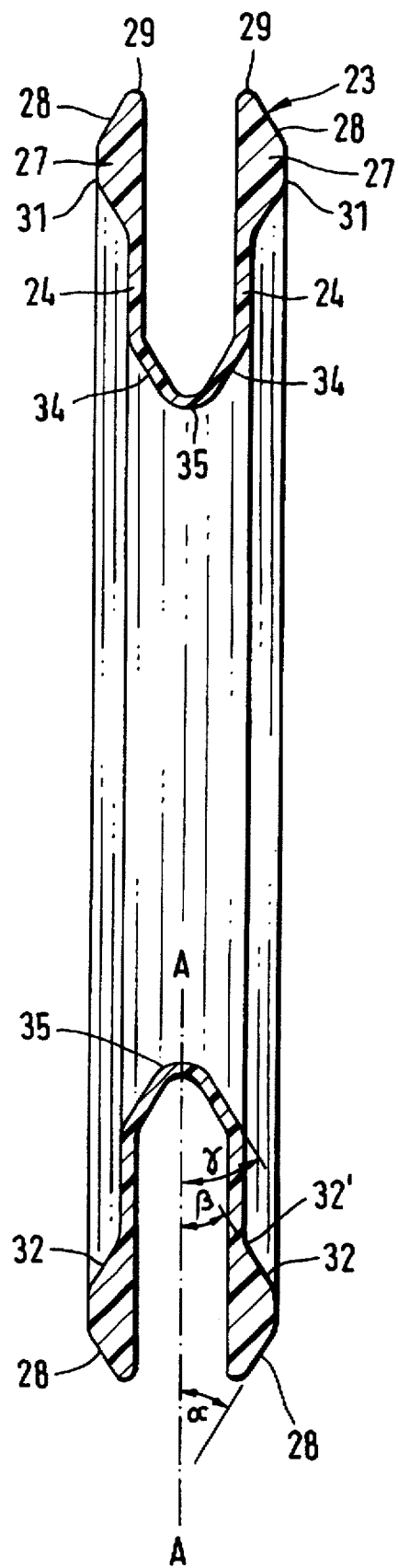
FIG. 3 is a longitudinal section through a supporting collar, first shown in FIG. 1.

The chamber plate filter 2 comprises a chamber plate 22 that carries an annular supporting collar 23 in the region of its flow-through opening. The edge region or edge section of the collar 23 being fashioned in a U-shaped cross-section as best seen in FIG. 3. Two legs 24 lie against the lateral chamber plate surfaces that form laterally extending ribs 25 that in turn have depressions 26 between them.

As viewed in radial direction outwardly from the center, the legs 24 of the U-shaped supporting collar 23 project beyond the clamp rings 18. At its end side, each leg 24 comprises an annular seating wedge 27 laterally extending in the direction of the neighboring diaphragm 14 to form a radially outwardly offset oblique surface 28 that drops off toward the lateral chamber plate surface.

This oblique surface 28 describes an angle α of about 30° with the longitudinal center plane A—A of the chamber plate (see FIG. 2). A rounded portion 29 of the oblique surface 28 merges into an inside wall 30 of the leg 24. A surface 31 proceeding parallel to the lateral chamber plate surface adjoins the radially inward end of the oblique surface 28 of the seating wedge 27. The radial length thereof is shorter than that of the oblique surface 28. A flow guide surface 32 that is formed by the seating wedge 27 precedes the oblique surface 28 and the roof cap or surface 31. The flow guide surface 32 proceeds essentially planarly upon the formation of a first wedge angle β of about 30° with reference to the longitudinal center plane A—A of the chamber plate 22. The first wedge angle β may range from 20° to 40°. The flow guide surface 32 is also radially outwardly offset with respect to a rounded outside edge surface 33 of the clamp ring 18, namely such that the distance x between lateral surfaces a, b of the clamp ring 18 and of the supporting collar 23 lying opposite one another is essentially not diminished. As shown in FIG. 2, a distance y between the flow guide surface 32 and the outside edge surface 33 roughly corresponds generally to the distance x.

The aforementioned lateral surface "a" adjoins proceeding from the foot region 32' of the flow guide surface 32. This proceeds such that the distance x between the lateral surfaces a, b is essentially not diminished but, as shown, proceeds radially relative to the flow-through opening 4 and, therefore, parallel to the lateral surface b of the clamp ring 18.

Radially inwardly upstream relative to the flow guide surface 32, each leg 24 of the supporting collar 23 forms a further flow guide surface 34. As may be derived from FIGS. 1 and 2, this flow guide surface 32 leads in a radially inward direction to a further enlargement of the spacing of the lateral surfaces a, b, accompanied by an enlargement of the admission cross-section proceeding from the slurry channel 5. The opposing angled flow surface 34 also proceeds essentially planarly and describes a second wedge angle γ of about 30° with reference to the longitudinal center plane A—A. The second wedge angle γ may range from 20° to 40°. The wedge angles β, γ of the two flow guide surfaces 32, 34 can be of about the same size.

The two further flow guide surfaces 34 lying opposite one another merge into one another via a rounded portion 35. The rounded portion 35 proceeds approximately concentrically with the aperture edge 36 of the flow-through opening 4 of the chamber plate 22.

The U-legs 24 are supported against the rib field 25 of the chamber plate 22. The radially inwardly directed section 22' of the chamber plate 22 is fashioned thinner than and set back relative to the rounded collar portion 35 so that a narrow gap 37 is present between this section 22' and the U-legs 24 as well as the aperture edge 36. The chamber plate 22 together with supporting collar or sleeve is enveloped by a filter cloth 38.

The residual moisture of the filter cake is reduced farther by the after-pressing and the removal of the cake. The solid constituents of the slurry that form the filter cake are collected by the filter cloth 21, 38 of the diaphragm plate filter 1 and chamber plate filter 2 respectively. The filtered liquid passes through the filter cloth 21, 38 and is eliminated in a known way. The slurry is introduced under pressure into the slurry channel 5 and proceeds into the filter space 39 via the admission cross-sections between the plate filters 1, 2 disposed opposite one another. When the diaphragms 14 are then charged with a liquid or gaseous pressure medium, the press diaphragms 14 arc outward, as may be seen from the dot-dash illustration in FIG. 2. The regions of the diaphragms 14 proceeding concentrically with the slurry channel press against the oblique surfaces 28 of the seating wedge 27 of the supporting collar 23, whereby the dot-dashed lines in FIGS. 1 and 2 illustrate the after-pressing into the respectively empty chambers. The seating wedges 27 thereby effectively prevent a mechanical destruction of the flexible diaphragm plates 14.

In the exemplary embodiment, the supporting collar 23 is composed of a rubber-like, flexible material and can be easily subsequently allocated to chamber plates 22 that are already present, thereby greatly benefiting a retrofitting of an existing chamber plate filter press to form a diaphragm plate filter press.

While only one embodiment has been set forth, alternative embodiments and various modifications will be apparent to those skilled in the art. These and other alternatives are considered equivalents and within the spirit and scope of the present invention. It is intended that the scope of the invention be limited only by the hereafter appended claims.

I claim as my invention:

1. A plate filter press comprising:

an alternating arrangement of chamber plate filters and diaphragm plate filters;

each chamber plate filter comprising a chamber plate, a collar and a chamber filter material, the chamber plate including an edge, the collar having a general u-shaped edge section and two extending legs, the edge of the chamber plate being disposed in the u-shaped edge section of the collar, at least a portion of chamber plate being disposed between the legs of the collar, the collar being disposed between the chamber filter material and the chamber plate, the legs of the collar further comprising a seating wedge which extends outwardly toward an adjacent diaphragm plate filter, each diaphragm plate filter comprising a diaphragm plate disposed between two diaphragms, the two diaphragms being held against the diaphragm plate by a ring clamp, the diaphragms being covered by a diaphragm filter material.

2. The plate filter press of claim 1, wherein each annular seating wedge includes a frustum-shaped base which terminates in a flat surface.

3. The plate filter press of claim 2, wherein the frustum-shaped base extends outward at a first wedge angle defined as the angle between a longitudinal center plane of the chamber plate and an outer surface of the frustum-shaped base, the first wedge angle ranging from about 20° to about 40°.

4. The plate filter press of claim 3, wherein the first wedge angle is about 30°.

5. The plate filter press of claim 1, wherein the u-shaped edge section of the collar further comprises two opposing angled flow surfaces that extend outward from a longitudinal center plane of the chamber plate as the two opposing angled flow surfaces extend away from a distal end of the u-shaped edge section.

6. The plate filter press of claim 5, wherein the two opposing angled flow surfaces extend outward from the longitudinal center plane of the chamber plate at a second wedge angle ranging from about 20° to about 40°.

7. The plate filter press of claim 6, wherein the second wedge angle is about 30°.

8. The plate filter press of claim 2, wherein the frustum-shaped base extends outward at a first wedge angle defined as the angle between a longitudinal center plane of the chamber plate and an outer surface of the frustum-shaped base, the u-shaped edge section of the collar further comprises two opposing angled flow surfaces that extend outward from a longitudinal center plane of the chamber plate as the two opposing angled flow surfaces extend away from a distal end of the u-shaped edge section, the two opposing angled flow surfaces extend outward from the longitudinal center plane of the chamber plate at a second wedge angle.

9. The plate filter press of claim 8, wherein the first wedge angle and the second wedge angle are approximately equal.

10. The plate filter press of claim 8, wherein the first wedge angle and the second wedge angle range from about 20° to about 40°.

11. The plate filter press of claim 8, wherein the first wedge angle and the second wedge angle are both about 30°.

12. The plate filter press of claim 1, wherein the collar is flexible.

13. The plate filter press of claim 1, wherein the collar is attached to the chamber plate.

14. The plate filter press of claim 1, wherein the collar is attached to the filter material.

15. The plate filter press of claim 1, wherein the collar comprises two asymmetrical halves that are attached together.

* * * * *